G. S. COX.
HAIRCLOTH LOOM.
APPLICATION FILED NOV. 14, 1906.

948,370.

Patented Feb. 8, 1910.
6 SHEETS—SHEET 1.

FIG. 1.

WITNESSES:

INVENTOR
George S. Cox
BY
Harding & Harding
ATTORNEYS.

G. S. COX.
HAIRCLOTH LOOM.
APPLICATION FILED NOV. 14, 1906.

948,370.

Patented Feb. 8, 1910.
6 SHEETS—SHEET 4.

WITNESSES:

INVENTOR
George S. Cox
BY
Harding & Harding
ATTORNEYS.

G. S. COX.
HAIRCLOTH LOOM.
APPLICATION FILED NOV. 14, 1906.

948,370.

Patented Feb. 8, 1910.
6 SHEETS—SHEET 5.

WITNESSES:

INVENTOR
George S. Cox
BY
Harding & Harding
ATTORNEYS.

UNITED STATES PATENT OFFICE.

GEORGE S. COX, OF FITZWATERTOWN, PENNSYLVANIA, ASSIGNOR TO HIMSELF, AND WALTER S. COX, OF PHILADELPHIA, PENNSYLVANIA, TRADING AS GEORGE S. COX AND BROTHER.

HAIRCLOTH-LOOM.

948,370.  Specification of Letters Patent.  Patented Feb. 8, 1910.

Application filed November 14, 1906. Serial No. 343,336.

*To all whom it may concern:*

Be it known that I, GEORGE S. Cox, a citizen of the United States, residing at Fitzwatertown, county of Montgomery, and State of Pennsylvania, have invented a new and useful Improvement in Haircloth-Looms, of which the following is a full, clear, and exact description, reference being had to the accompanying drawings, which form a part of this specification.

My invention relates to looms, and particularly to that type of loom adapted to the manufacture of hair-cloth and similar goods, wherein the weft is prepared in separate strands or picks, substantially equal in length to, or slightly longer than, the width of the goods to be woven.

The object of this invention is to improve the construction of the loom set forth in the patent granted to me July 10, 1903, No. 756,334, which discloses a loom having a shuttle or nipper adapted to insert picks of hair in its traverse in both directions between the sheds of warp.

To this end, the present invention consists of general and specific novel features of construction and arrangement, hereinafter fully set forth in detail.

In the drawings: Fig. 8 is an enlarged plan view of one end of the lay. Fig. 9^A is a front elevation of the jaw opener.

9 is the frame of the loom.

10 is the lay secured to brackets 102 secured to studs 103 turning in bearings in the frame 9.

11 are the heddle frames and 110, 110, the springs connecting same with the girts 32 and 320 of the loom.

20 is the crank shaft, 100 a crank thereon, and 101 the sweep connecting the crank and the lay, by which means the lay is given the usual reciprocating motion.

Extending along the shuttle-traverse of the lay, but not secured thereto, is a plate 12, having secured thereto the movable shuttle-boxes 13 and 14.

15 is the shuttle having a pair of jaws 150 and 151 at one end and another pair of jaws 152 and 153 at the other end.

16 and 17 are the receptacles for the strands of horse-hair weft.

18 and 19 are the selectors.

Generally speaking, the operation of the foregoing parts is as follows: The selector 18 selects a single pick of weft from the receptacle 16. The jaws 150 and 151 of the shuttle 15 clamp the end of the selected pick, which at the same time is released from the selector, and pull the pick from left to right (Fig. 1) between the sheds of warp and then release the same. The selector 19 selects a single pick of weft from the receptacle 17, and the jaws 152 and 153 of the shuttle 15 clamp the end of the last selected pick, pull the same from right to left (Fig. 1) between the sheds of warp and then release the same, and so on alternately and continuously, the sheds of warp being changed, preferably, after each pick.

The above described operation is effected by means of the mechanism to be hereinafter described.

21, 22 are the picker-sticks. The picker-sticks are secured respectively to studs 210 and 220 turning respectively in bearings in the two brackets 102, 102. The upper part of the picker-stick 21 is slotted and receives a pin 211 secured to the picker-head 212. The picker-stick 22 is similarly connected to its picker-head 222. Extending through the picker-head 212 are guide-bars 23, along which the picker-head slides.

230, 231 are brackets, secured to the lay, supporting the ends of the guide-bars.

232, 232, are buffers, surrounding the guide bars near their ends, against which the picker head strikes at the ends of its extreme movements. Similar guides are provided for the picker-head 222.

Figures 6, 7:
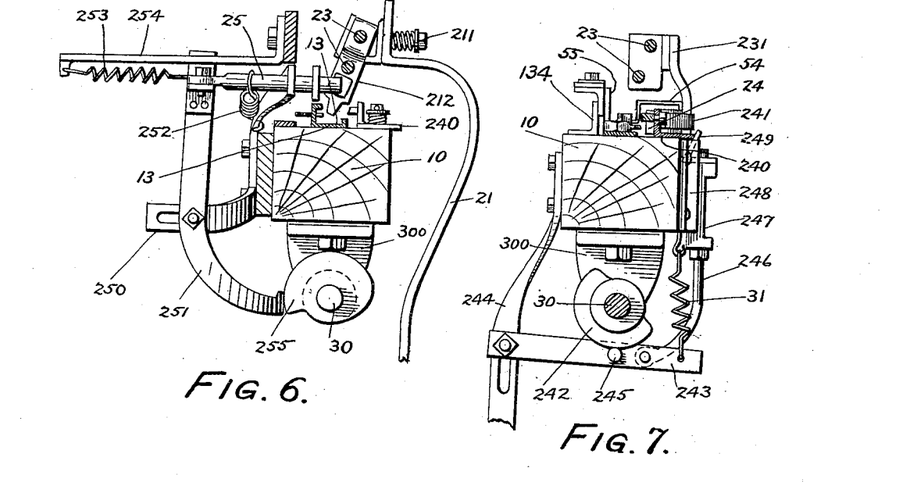
Fig. 6 is a section on the line 6—6 of Fig. 8.
Fig. 7 is a section on the line 7—7 of Fig. 8.
Figures 8, 9A:
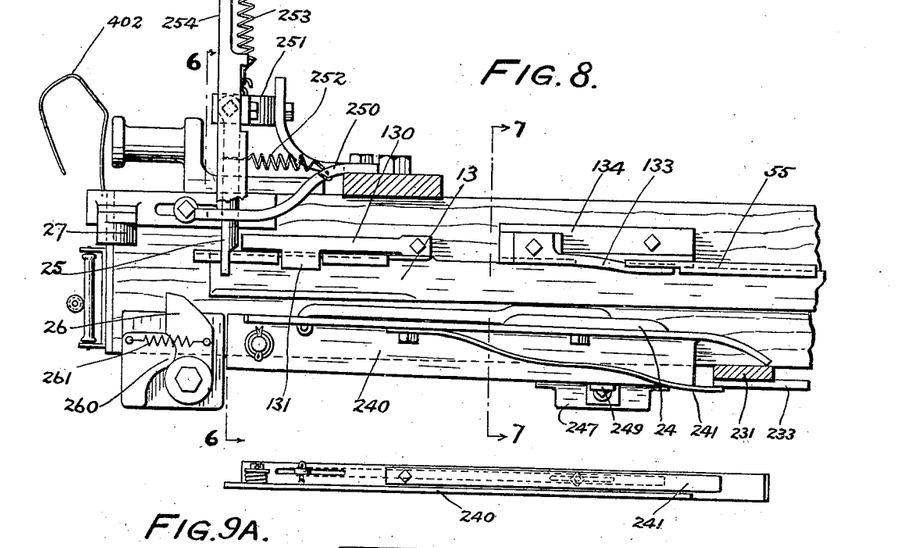

When the shuttle 15 is at one side of the loom—say to the extreme left, Fig. 1—the picker stick 21, at the beginning of the backward movement of the lay, swings inwardly, causing the picker head 212 (which at the beginning of its stroke, engages a shoulder 159 on a projection 158 on the upper face of the shuttle near one end thereof) to throw the shuttle, initially by direct engagement and thence by momentum, nearly across the loom, as will be hereinafter more fully described. In the same way, at the beginning of the next backward movement of the lay, the picker stick 22 and its picker head 222 return the shuttle from right to left, a similar projection and shoulder being provided on the other end of the shuttle. The mechanism for actuating the picker sticks will be hereinafter described. Inasmuch as the weft is in separate strands of a length but little greater than the width of the fabric to be woven, it is important that the shuttle shall move to, but not beyond, a point that will insure the forward end of the weft being drawn just beyond the edge of the warp. To effect this, the shuttle is caused to make slightly less than its complete throw by throwing it into the shuttle-box 13 or 14 and then the throw of the shuttle is completed by moving the shuttle-box itself, with its contained shuttle, the slight distance necessary to complete the throw of the shuttle. The shuttle-boxes are moved by means of the rocking lever 120, pivoted between its ends to the lay and having secured thereto the arm 121 pivoted to the plate 12 between its ends. By reciprocating the lever 120, the plate 12 is moved in opposite directions, one movement causing one shuttle-box (say 13) to carry its contained shuttle to its extreme left-hand position (Fig. 1) and restore the other shuttle-box 14 into position to receive the shuttle on its return throw to the right, and the other movement of the rocking lever causing the shuttle box 14 to carry its contained shuttle to its extreme right-hand position (Fig. 1) and restore the shuttle-box 13 into position to receive the shuttle on its next throw to the left. The mechanism for actuating the rocking-lever 120 will be hereinafter described. As the shuttle is thrown across the loom, it is necessary as hereinbefore described, to open the trailing movable jaw of the shuttle in order that it may, at the proper time, release the pick of hair that it carries. This is effected by means of the cam 24 secured to the angle bar 240, pivoted to the lay (see Figs. 7 and 8), and in line of travel of the movable jaws 151 and 153 of the shuttle. As the shuttle travels from right to left (Figs. 1 and 8) the cam 24 opens both movable jaws. The opening of the forward movable jaw 151 performs no useful function, but the opening of the trailing movable jaw 153 causes the pick to be released from jaws 152 and 153 at the proper time. As soon as the jaws pass beyond the cam 24, the movable jaws 151 and 153 are closed by their actuating springs 154 and 155. Another cam, a duplicate of cam 24, and located at the opposite side of the loom, acts upon the movable jaws in the reverse throw of the shuttle, and causes the trailing jaws 150 and 151 to release the pick.

Figure 9:
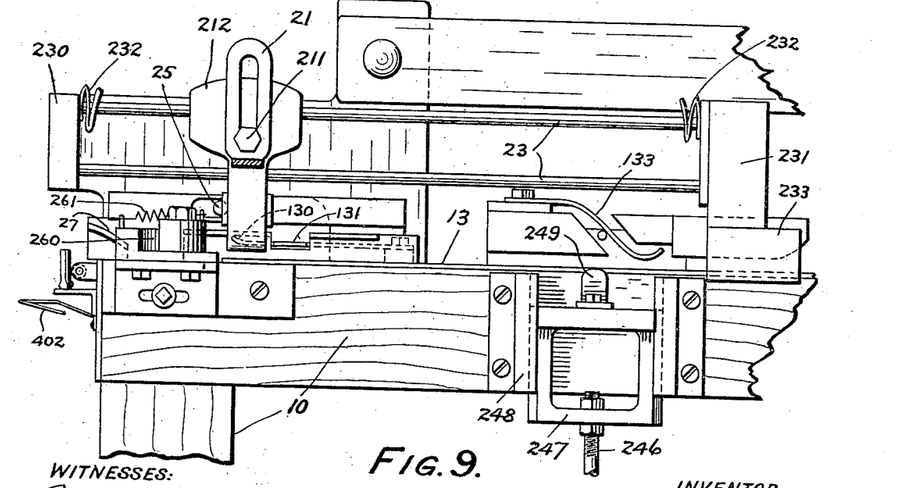
Fig. 9 is a front elevation of same with jaw-opener omitted.

To enable a shuttle-box to hold the shuttle thrown into it, a spring-actuated locking lever 130, having a projection 131, is secured to the shuttle-box 13 and the shuttle is provided on its upper face, near the end thereof carrying the jaws 150 and 151, with a recess 156, into which snaps the projection 131 of the lever 130 as the shuttle reaches that part of the box at which it should remain during the subsequent travel of the shuttle-box. The shuttle-box 14 is provided with a similar locking lever, which, in the return throw of the shuttle engages the recess 157 near the end of the shuttle carrying the jaws 152 and 153. On account of the rapidity with which the shuttle is thrown into the box, the lever 130 cannot ordinarily be relied upon to stop the shuttle in its travel with the box, and provision has therefore been made to instantly reverse the direction of travel of the shuttle, when the recess 156 passes beyond the projection 131, thus enabling the projection to snap into the recess on this reverse movement. The mechanism for so reversing the shuttle is as follows: 250 is a bracket secured between its ends to the lay (see Figs. 6 and 8). 251 is a lever pivoted between its ends to the bracket 250. 25 is a stop-pin or lever pivoted at one end to the lever 251, the other end extending over the shuttle traverse. 252 is a spring, secured at one end to the bracket 250 and at the other end to the lever 25. When the lever 25 is in operative position, it extends outside of and adjacent to the picker head 212. It is held in this position by means of a cam 255, secured to a shaft 30 and engaging the free end of lever 251. If the shuttle, in its movement into and within the shuttle-box, fails to engage the locking lever 130, it strikes the picker head 212 and moves it out toward the side of the loom, the picker-head moving out the free end of stop-pin 25. As the stop-pin moves out the tension of spring 252 increases and the shuttle is thus gradually brought to a stop. Instantly thereafter the spring 252 returns the lever 25 to its normal position, moving in the shuttle head, which in turn moves in the shuttle, the latter continuing to move until the locking lever 130 engages the recess 156. 133 is a leaf spring, attached to the angle-plate 134 secured to the lay. Before the movement of the shuttle-box begins, the distance of spring 133 from projection 131 equals the distance between the recesses 156 and 157 of the shuttle. As the shuttle is moving to the left (Fig. 9) this spring snaps into both recesses and exercises a retarding effect on the shuttle, and when the projection 131 finally settles into recess 156, the spring 133 settles into recess 157, thus holding both ends of the shuttle in the box.

The provision of two recesses in the shuttle, one near each end, has the following important advantage in addition to the advantage of enabling the shuttle to be retarded before it is locked, as just described. It is necessary that the loom should be capable of making different widths of goods. It is desirable that in preparing the loom to weave a different width of goods, as little change as possible should be made in the shuttle actuating mechanism. It is obvious that with a narrower width of goods the length of the shuttle must be increased. If the shuttle were provided with a single centrally disposed orifice, adapted to be engaged by the lock 131, the position of the lock 131 on the loom would have to be altered with each variation of length of the shuttle, with obvious resultant complications. By providing an orifice near each end of the shuttle, and in shuttles of different length placing each orifice at the same distance from the corresponding end of the shuttle, it is unnecessary to make any change in the position of the locking device. All that is necessary is to shift the position of the spring 133, which is a comparatively simple matter.

When the shuttle is thus thrown into and locked within the shuttle-box, the shuttle-box, with its contained shuttle, is moved out as hereinbefore described. To enable the shuttle-box to move out, it is necessary to withdraw the stop-pin 25 from in front of the picker head. This is effected by turning the cam 255 until the end of lever 251 is opposite the low point of the cam, whereupon the spring 253, secured at one end to the lever 251 and at the other end to a bracket 254 secured to the lay, acts to withdraw the stop-pin 25 from in front of the picker head, and the shuttle-box is free to move out toward the side of the loom. The stop-pin 25, with its actuating mechanism, is duplicated at the opposite side of the loom, which duplicate mechanism acts in a similar manner in connection with the shuttle-box 14. When the shuttle-box 13 has partially completed its outward movement it is stopped temporarily until the shuttle, in the forward movement of the lay, nearly reaches a point opposite the hair held by the selector, the extent of the initial forward movement of the shuttle-box being sufficient to enable the shuttle to just clear the selector. The shuttle box is then given its final outward movement, during which the movable jaw 151 of the shuttle engages the cam face of a cam 26 pivoted to the lay and held from moving out beyond the position illustrated in Fig. 8 by abutting against a stop 260 secured to the lay. The cam 26 acts upon the jaw 151 to open it, and when the jaw 151 passes beyond the cam, it closes upon the pick of hair which has been previously selected by the selector. The cam 26 is duplicated on the opposite side of the loom and acts to open the movable jaw 153. At the end of the outward movement of the shuttle-box, the locking lever 130 rides up the cam 27, thus withdrawing the projection 131 from the recess 156 in the shuttle and unlocking the shuttle. The shuttle is then free to be thrown across the loom in the opposite direction by means of the picker 21, which acts at the beginning of the backward movement of the lay. At the beginning of the return movement of the shuttle, the rear end of the movable jaw 151 strikes the outer straight side of the pivoted cam 26 turning the cam on its pivot until the jaw clears the cam, after which the cam is returned to its normal position by means of the spring 261.

It is obvious that provision must be made for withdrawing the cam 24, as otherwise this cam would act to open the movable jaw 151 and release the pick of hair before the insertion of the same into the shed. The following means are provided to operate the angle-bar 240 so as to advance and retract the cam 24 at the proper time. (See Figs. 6, 7, 8, 9, 9ᴬ.) The angle-bar 240 is normally held out of line of travel of the movable jaws of the shuttle by means of the leaf spring 241, one end of which is secured to the angle-bar while the other end extends in front of the mouth-piece 233 secured to the bracket 231. 242 is a cam on the shaft 30. 243 is a lever pivoted at one end to the bracket 244 secured to the lay. 245 is a pin on lever 243, which pin is engaged by the cam 242. 246 is an arm attached to the lever 243, said arm being attached to the yoke 247 sliding in guides 248 secured to the lay. 249 is a cam secured to the yoke 247 and engaging the edge of the angle-bar 240. 31 is a spring secured at the other end of the lever 243. When, in the rotation of the shaft 30, the cam 242 depresses the lever 243, the cam 249 is drawn down and the spring 241 is effective to draw the angle-bar 240 forward and render the cam 24 inoperative. When the low point of the cam 242 comes opposite the pin 245 on the lever 243, the spring 31 acts to raise the lever 243, and the cam 249, in its upward movement moves the angle-bar 240 so as to bring the cam 24 into the path of travel of the movable jaws of the shuttle.

54 is a guide (see Fig. 7) secured to the bracket 231. This guide is so shaped as to extend over and close to the movable jaw of the shuttle and alongside of and close to the body of the shuttle. 55 is a guide secured to the angle-plate 134 and overlying the body of the shuttle at the other side of the shuttle. These guides serve the purpose of guiding the shuttle both into and out of the shuttle-box.

It will be understood that the shuttle-box need not be of box form, as the form or shape of the box may be modified and still be equally well adapted to receive and retain the shuttle.

Figures 2, 4, 16:
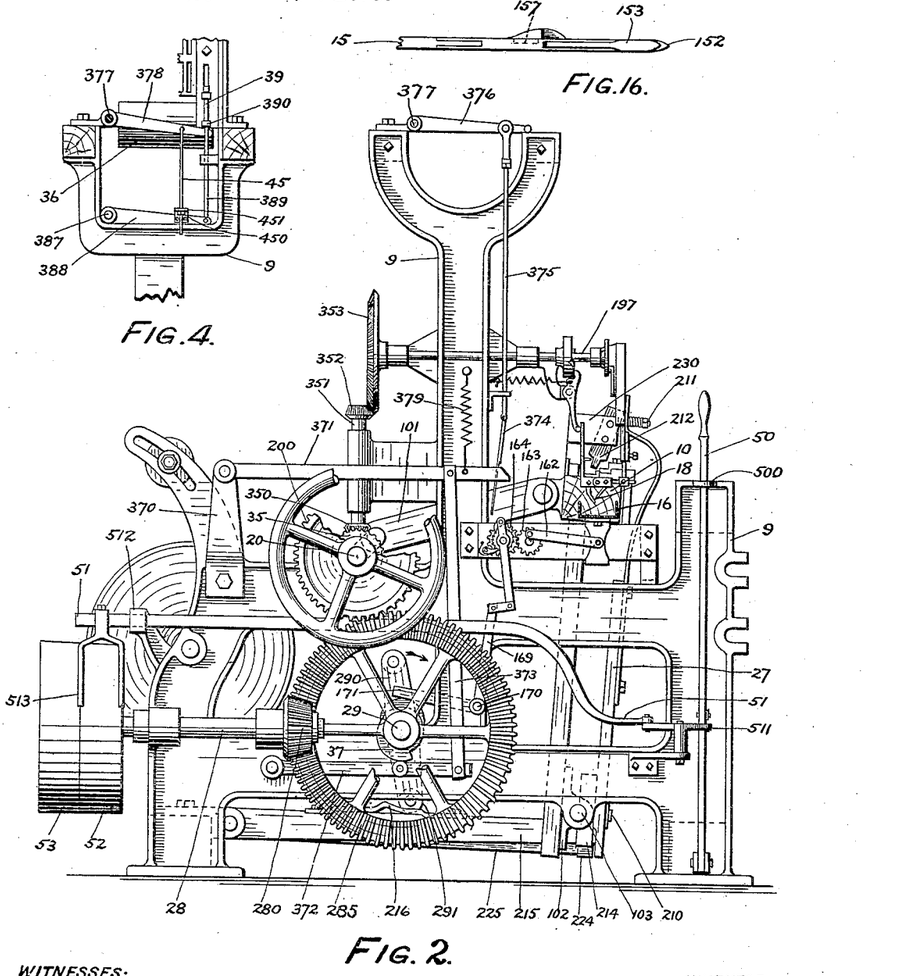
Figs. 2 and 3 are elevations of opposite sides of the loom.
Fig. 4 is a section on the line 4—4 of Fig. 1.
Fig. 16 is a detail elevation of part of the shuttle.
Figure 15:
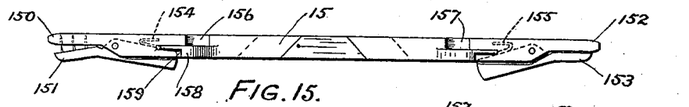
Fig. 15 is a detail plan view of the shuttle.

It will be observed, by reference to Figs. 15 and 16, that the upper face of each projection 158 slopes toward opposite ends of the shuttle, and that the cut away part of the projection forming the shoulder 159 extends only part way across the projection. By means of this construction provision is made, as before described, for actuating the shuttle from the picker head, while at the same time the convex upper face of the projection permits it to pass between the warp sheds in both directions without danger of catching in the warp.

I shall now describe the means for operating the picker sticks.

28 is the main driving shaft, having secured thereto the bevel gear wheel 280. This bevel gear wheel meshes with the bevel-tooth part of the wheel 285 on the cam shaft 29. The spur-toothed part of the wheel 290 drives the spur gear 200 on the crank shaft 20, which, as before described, operates the lay. On the cam shaft 29 are the arms 290 and 291. Secured to the stud 210 (which, as before stated, carries the picker stick 21) is the half-disk 213, to which is secured one end of the strap 214. The other end of the strap is secured to a treadle 215 pivoted on the machine frame. The treadle 215 has a cam 216 in line of travel of a roller 292 on the arm 285. A spring 217, secured at one end to the picker stick and at the other end to one of the girts 32 of the loom, tends to maintain the picker stick in its inoperative position. Similar mechanism is provided between the cam-shaft 29 and the stud 220 carrying the picker-stick 22—223 representing the half disk, 224 the strap, and 225 the treadle. When the roller on arm 290 strikes the treadle 215 and depresses it, the picker-stick 21 swings in the direction to throw the shuttle across the loom as before described, the picker-stick being returned by the spring 217. The arm 291 operates the picker-stick 22 in a similar manner, but alternately with the operation of the picker-stick 21.

Figure 5:
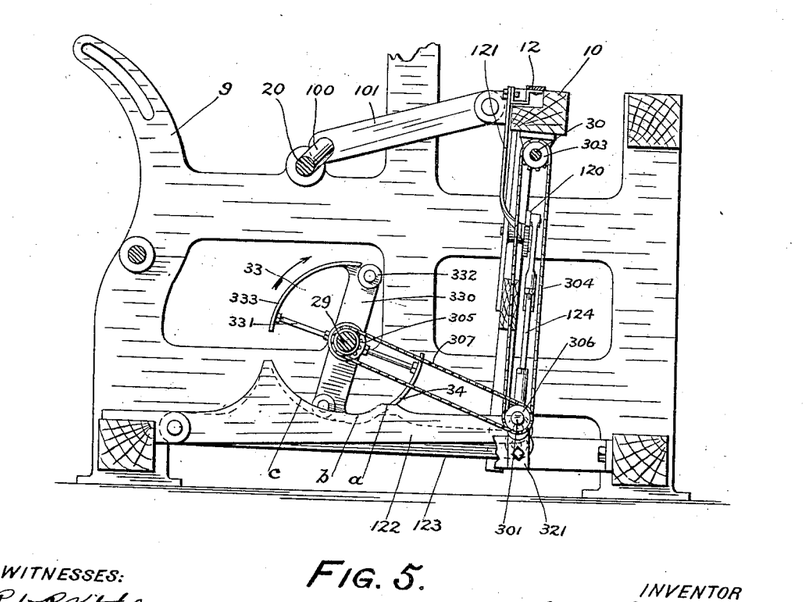
Fig. 5 is a section on the line 5—5 of Fig. 1.

The mechanism for operating the rocking lever 120 (which, as before described, operates the plate carrying the shuttle-boxes) will now be described (see Fig. 5).

Secured to the cam-shaft 29 are the segmental wheels 33 and 34, each wheel comprising arms 330 and 331, each secured to the shaft, a roller 332, on the end of the arm 330 and a curved plate 333 connecting the arms 330 and 331, said plate being on an arc described from the axis of the cam-shaft, with its working face at a radial distance from such axis equal to the distance from such axis of the working face of the roller 332.

122, 123, are treadles pivoted on the machine frame. The two treadles are connected by means of the links 124, 125, respectively to opposite ends of the rocking-bar 120, which ends are slotted to receive pins on the upper ends of the links. Each treadle is provided with a cam $a$—$b$—$c$ in line of travel of the corresponding segmental wheel 33 or 34. During the engagement of the segmental wheel 33 with the cam of the treadle 122, the treadle is operated to rock the rocking-bar 120 in one direction, thereby, through arm 121 and plate 12, moving the shuttle-boxes 13 and 14 to the left (Fig. 1.) During the engagement of the segmental wheel 34 with the cam of the treadle 123, this treadle is operated to rock the rocking-bar 120 in the other direction, thereby moving the shuttle boxes to the right (Fig. 1). The combined length of the cam $a$—$b$—$c$ and the working face of its actuating segmental wheel 33 or 34 is such that each wheel engages its corresponding cam during substantially one-half a revolution, or slightly more than one-half a revolution, of the cam-shaft, so that one of the two treadles is at all times in engagement with its actuating cam.

In describing the operation of a shuttle-box, I have stated that, in its outward movement, with its contained shuttle, it first advances a short distance, then stops until the shuttle is opposite the hair held by the selector, and is then given its final movement, in which the shuttle closes on the hair. To effect this mode of operation, the cam of each treadle 122 or 123 is provided with the three portions $a$, $b$ and $c$. Portion $a$ is sharply eccentric with the axis of the cam-shaft 29, so that the treadle 122 or 123 is being quickly depressed during the travel of the roller over portion $a$; portion $b$ is concentric with the axis of the cam-shaft, so that the treadle is held stationary during the travel of the roller of cam 33 or 34 over portion $b$; while portion $c$ is somewhat eccentric with the axis of the cam shaft, so that the treadle, during the travel of the roller over this portion of the cam, is again moved down. From this operation of the treadles 122 and 123, the mode of effecting the described movement of the shuttle-boxes will be understood.

The means for operating the shaft 30 will now be described. This shaft is the one carrying cams 255 (which control the operation of the stop-pins 25) and cams 242 (which control the operation of the jaw-opening cam 24). This shaft 30 turns in brackets 300 depending from the lay. It is driven from a shaft 301 by means of sprocket wheels 302 and 303, secured respectively to shafts 301 and 30, and a sprocket chain 304 connecting the two sprocket wheels. The shaft 301 turns in a bearing 321 secured to the girt 32. The axis of shaft 301 and studs 103 (on the latter of which the lay is pivoted) coincide, so that, although the shaft 30 moves bodily with the lay and the shaft 301 has no bodily movement, the distance between their axes does not vary. The shaft 301 is driven from the cam-shaft 29 by means of sprocket wheels 305 and 306, secured respectively to shafts 29 and 301, and a sprocket chain 307 connecting the two sprocket wheels.

The selector 19 (see Figs. 1 and 3) is of the usual construction and consists of the part 190, vertically movable in a guide on the bracket 192 and carrying the fixed jaw of the selector, and the part 191, hinged to the part 190 and carrying the movable jaw of the selector.

Figure 3:
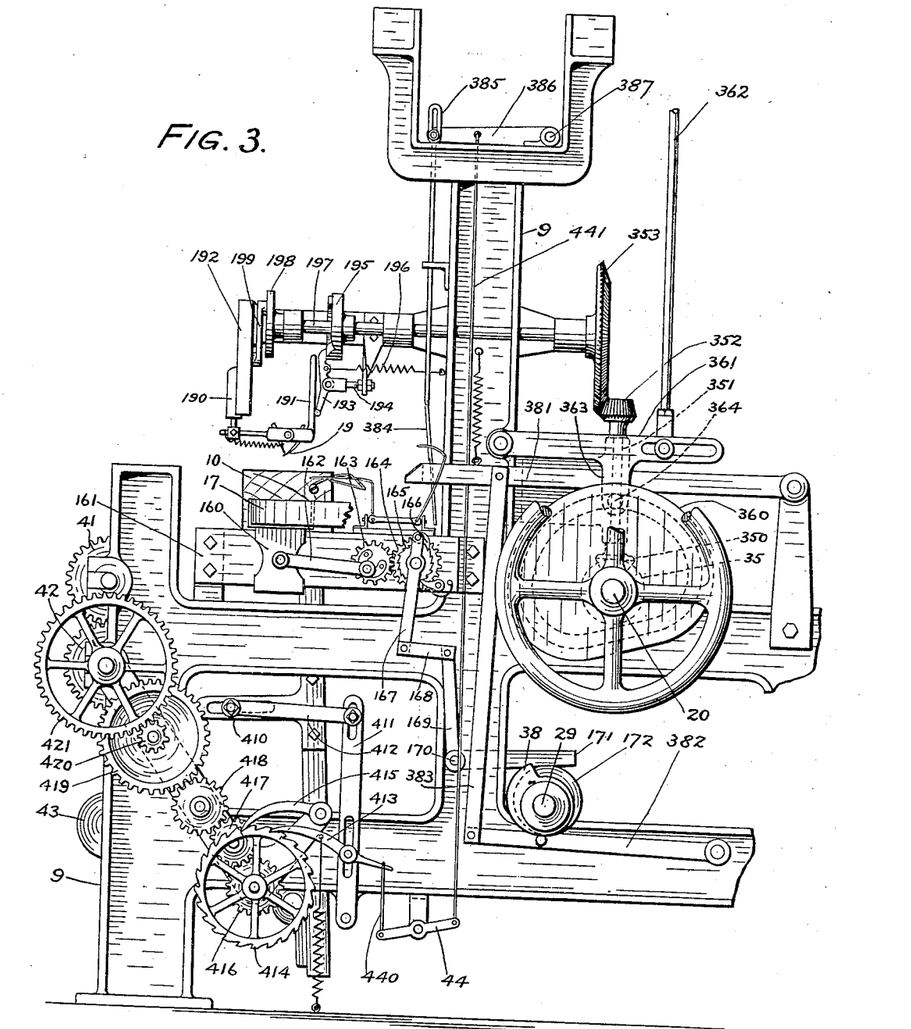

193 is a lever pivoted between its ends on the hanger 194.

197 is a shaft to which are secured the cam 195 and the crank-disk 198.

199 is a connecting rod between the crank-disk 198 and the part 190 of the selector.

196 is a tension spring connecting the upper end of lever 193 and the frame.

As the shaft 197 rotates the selector is moved up and down. The upepr end of lever 193 is brought opposite the notched part of the cam 195 when the selector is in position to take the hair. Into the notch in the cam, the lever 193 is snapped by the spring 196, which causes the lower end of the lever 193 to engage the part 191 of the selector and move it on its hinge to open the jaws of the selector. As the upper end of the lever 193 rides up to the high point of the cam 195, the lever 193 is retracted from the part 191 of the selector, permitting the latter to drop to close the jaws of the selector. When the lever 193 rides off the high part of the cam, it acts on the part 191 to retract the movable jaw of the shuttle, freeing the hair to allow the nipper to pull it across the loom.

The selector 18 embodies the same parts as selector 19, its driving shaft being also designated by the reference numeral 197. Each shaft 197 is provided with a bevel gear 353 engaging a bevel gear 352 on the upright shaft 351. Each shaft 351 has a bevel gear 350 engaging a bevel gear 35 on the crank shaft 20. The relative sizes of the actuating gears are so arranged that each selector will operate at alternate throws of the shuttle, and the cams for actuating the movable jaws respectively are so positioned that the two selectors will act alternately and each at the proper time.

The hair receptacles 16 and 17 are each given the usual step-by-step motion back and forth to cause the selector to pick hair at all points across the width of the receptacle. This motion, instead of being effected by connections to the receptacle from the lay, is effected by connections to the receptacle from the cam shaft (see Figs. 2 and 3). Each receptacle is supported on a slide 160 movable on the guide block 161. The slide 160 is connected, by a connecting rod 162, with a gear 163, driven by a gear 164, the shafts of both gears turning in bearings in the guide-block 161. Fast to the shaft of gear 164 is a ratchet-wheel 165, which is turned by a pawl 166 pivoted on the upper end of a lever 167. The lever 167 is pivoted between its ends on the shaft of gear 164, the lower end of the lever being connected, by a link 168, with an arm 169 on a shaft 170 turning in bearings in the loom frame. Also secured to the shaft 170 is an arm 171 adapted to be operated by a cam 172 secured to the cam shaft 29. It will be understood that, as each cam 172 rotates, the hair receptacle controlled by it is caused to move step-by-step forwardly, and then step-by-step backwardly, bringing all sections of the hair receptacle across its width immediately under the corresponding selector. By actuating the hair receptacle from the cam shaft, and providing the cam surface with a concentric part of substantial length, it is possible to hold the hair receptacle stationary when the selector selects a hair and until the nipper grasps it, thus holding the hair stationary and in a true vertical position to cause the nipper to grasp the hair with more certainty than would be possible if the receptacle had any movement during the time stated. When, as heretofore, the receptacle is operated from the lay, it is impossible to avoid some movement of the receptacle during the time stated, and the hair held by the selector is drawn out of its desired true vertical position before the nipper grasps it.

The dobby or head motion is operated, as usual, from the cam shaft 20. In Figs. 1 and 3 are shown the following connections for this purpose. 360 is a grooved cam wheel on the crank shaft 20. 361 is a lever pivoted at one end on the loom frame, while its opposite end is slotted to receive a pin on the lower end of a rod 362. Between its ends the lever 361 has an arm 363 provided with a roller 364 engaging said cam. 36 is the dobby cylinder having the ratchet 365 engaged by the pawl lever 366. The connection between the rod 362 and pawl lever 366 is shown on the drawings simply as a bell-crank 367 pivoted at any convenient point and whose arms are connected respectively with the rod 362 and pawl-lever 366. It will be understood that, at each rotation of the crank-shaft, the dobby-cylinder is given a single part turn, thereby, through dobby mechanism not shown, but well known in the art, operating the harness frames to form a new warp shed.

Figure 10:
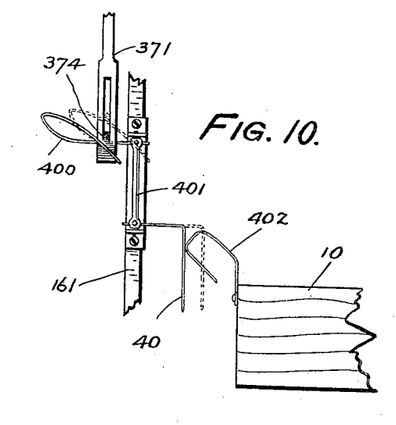
Fig. 10 is a detail plan view of the feed and dobby stop motion.
Figure 11:
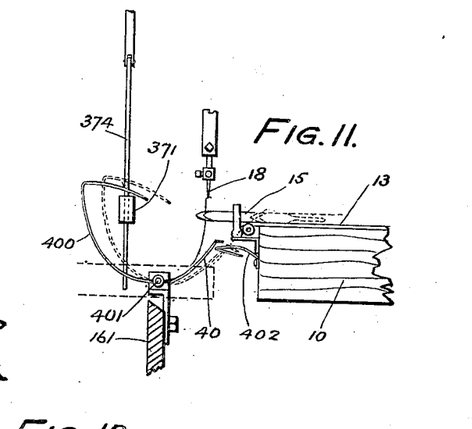
Fig. 11 is a detail front elevation of the same.

If either selector fails to grasp a hair or if either pair of shuttle-jaws fails, for any reason, to grasp a hair, it is important to temporarily stop the rotation of the dobby cylinder in order that there may not be more than one pick of hair to each shed of warp. This purpose is effected by the mechanism shown in Figs. 1, 2, 3, 4, 10 and 11. On the left hand side of the loom, Fig. 1, is a cam 37. 372 is a lever pivoted on the loom frame and engaging cam 37. Pivoted on a bracket 370 on the loom frame is a lever 371 connected to lever 372 by means of a link 373. 379 is a spring connecting lever 371 and the frame and holding the lever 372 against the cam 37. The free end of lever 371 is slotted and receives a notched lever 374 depending from a rod 375 whose upper end is pivoted on an arm 376 secured to a shaft 377 turning in bearings in the dobby frame. The opposite end of the shaft 377 has an arm 378 whose free end extends under a lug 390 on the slide 39. This slide underlies the pawl-lever 366. In the normal operation of the machine, when the jaws 150 and 151 of the shuttle grasp a hair and pull it between the sheds of warp, the hair itself, by means hereinafter described, moves the notched lever 374 toward the pivoted end of lever 371 and into such position that, in the upward movement of the lever 371, the latter does not engage the notched lever 374, and it is therefore not operated. When, however, the selector fails to grasp a hair, or for any other reason, the jaws 150 and 151 of the shuttle fail to pull a hair between the sheds of warp, the notched lever 374, by gravity, retains the position shown in Fig. 2, wherein the end of the lever 374 below the notch is shown in contact with the outer wall of the slot in lever 371; and when the lever 371 rises, the upper face thereof just beyond its slot engages the shoulder on lever 374 formed by the notch and moves up the lever 374 and rod 375, thereby, through arm 376, turning shaft 377, which, through the medium of arm 378, raises slide 39. The raising of slide 39 raises the pawl-lever 366 out of engagement with the ratchet wheel 365, so that, at the next movement of the pawl-lever, it fails to operate the dobby-cylinder 36. The means for moving the notched lever 374 into the inoperative position described is as follows: 40 is a finger secured to a shaft 401 turning in bearings on the guide-block 161. This finger is in such position that, in the normal operation of the machine the hair, as it is pulled through by the shuttle jaws, will override its horizontally extending free end and push it from the full-line position shown in Figs. 10 and 11 to the dotted line position, thus turning the shaft 401. To the shaft 401 is secured the finger 400 whose outer end is in contact, or nearly in contact, with the notched lever 374 and which, when the shaft 401 is turned as described, moves the notched lever 374 into its inoperative position. The action of the finger 400 upon the notched lever 374 is practically that of a cam, and its direction of extension and movement with respect to the direction of extension and movement of the notched lever 374 is such that it practically wedges against the notched lever 374 and remains in that position even after the hair has ceased to act upon the finger 40. To restore the fingers 40 and 400 to their normal position, the lay is provided with a finger 402, which, in its forward movement, engages and returns finger 400. At the same time the notched lever 374 returns to its normal position. When the jaws of the shuttle fail, for any reason, to pull a hair between the warp sheds, the finger 40, and consequently also finger 400, remain in their normal positions and the notched lever 374 remains in position to be moved up by the lever 371, thereby rendering inoperative the dobby cylinder as before described.

Figure 1:
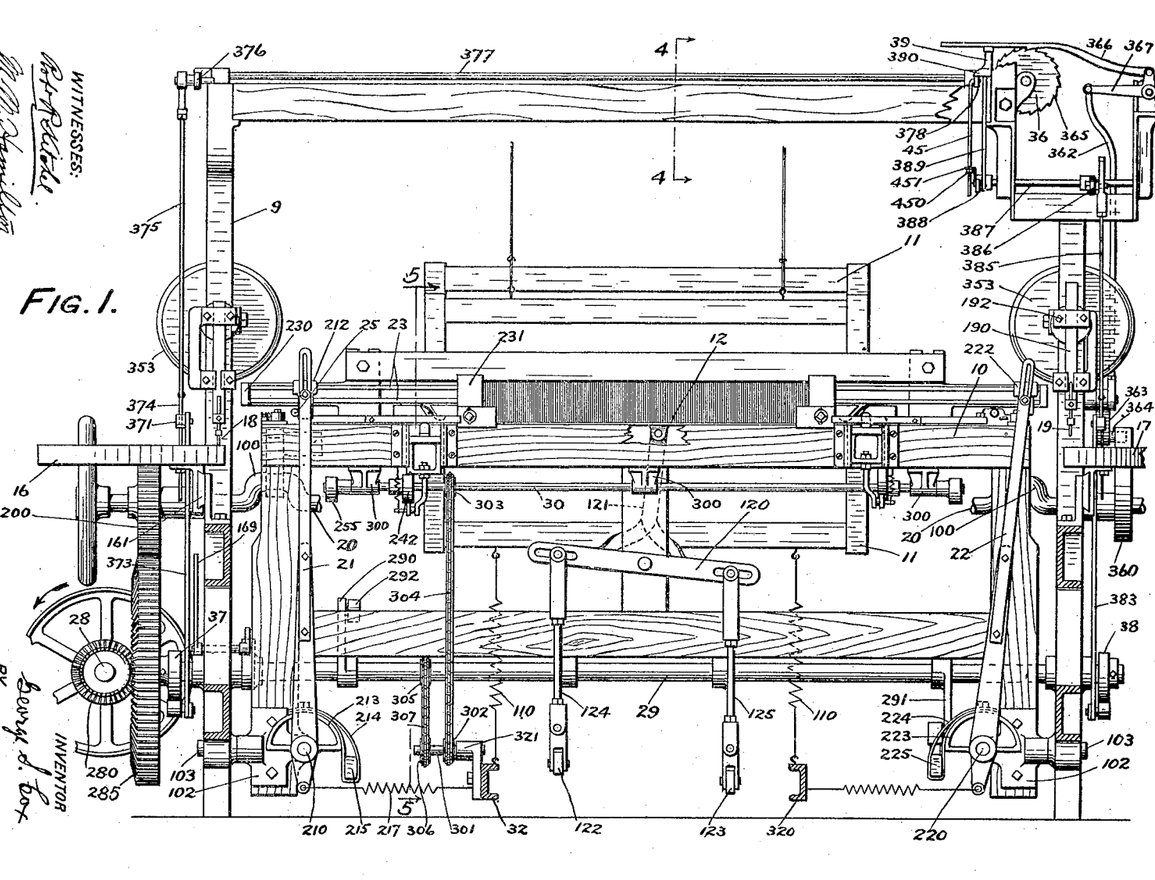
Figure 1 is a front elevation of the loom.

On the right hand side of the loom, Fig. 1, are, a cam 38, slotted lever 381, link 383, lever 382, and notched lever 384, corresponding in construction to the cam 37, slotted lever 371, link 373, lever 372 and notched lever 374 on the left hand side. There are also fingers 40, 400 and 402, the same in construction as those on the left hand side. The notched lever 384 pivotally depends from the lower end of a rod 385 whose slotted upper end engages a pin on the arm 386 secured to a shaft 387 turning in bearings on the dobby frame. The opposite end of the shaft 387 has an arm 388 to the outer end of which is pivoted a rod 389 sliding vertically in a guide on the dobby frame. This rod extends under the lug 390 on the slide 39. When the jaws 152 and 153 of the shuttle fail to grasp a hair and the notched lever 384 is consequently subsequently elevated by the lever 381, the rod 385 is moved up, thereby, through arm 386, turning shaft 387, which, through the medium of arm 388 and rod 389, raises the slide 39 and thus renders the pawl-lever 366 inoperative, so that, at the next movement of the pawl-lever, it fails to operate the dobby-cylinder 36. Thus, whenever the jaws at either side of the shuttle 15 fail to pull through a hair, due to the failure of the selector to select a hair or due to any other reason, no warp shed is formed, and thus it is insured that there shall be one pick of hair, no more and no less, in each shed of warp.

The following means are provided to operate the take-up rollers 41 and 42 (see Fig.

3). 410 is an arm secured to the lay, 411 a lever pivoted to the loom frame, and 412 a link connecting arm 410 and lever 411. 413 is a pawl pivoted on the lever 411. 414 is a ratchet wheel on a shaft turning in bearings in the loom frame and operated by the pawl 413. 415 is a holding pawl secured to the frame carrying the bearings for the chain of gears, 416, 417, 418, 419, 420 and 421, which connect the shaft of the ratchet wheel with the shaft of the take-up roller 42, which is geared to take-up roller 41. 43 is the cloth roller, which is operated from one of the take-up rollers in any convenient manner. At each forward movement of the lay, the pawl 413 actuates the ratchet wheel 414, which, through the chain of gears mentioned, actuates the take-up rollers.

It is important that the operation of the take-up rollers should be stopped whenever a pick of hair is missed and the operation of the shedding motion is consequently stopped as before described. This is effected by the following mechanism: 44 is a lever pivoted between its ends on the loom frame. 440 is a link connecting one end of the lever 44 and the pawl 413. 441 is a link connecting the other end of lever 44 with the lever 386. 45 is a rod depending from the arm 378 (see Figs. 1 and 4) and having a lug 450. 451 is a plate secured to arm 388 and having an orificed flange through which the rod 45 extends, the flange of the plate 451 overlying the lug 450. When, due to the failure of the jaws 152 and 153 of the shuttle to pull through a hair, the notched lever 384 and rod 385 are raised, thereby, through arm 386 and shaft 387, lifting arm 388, as before described, the pawl 413 is lifted out of contact with the ratchet wheel 414, by the operation of the connections 441, 44 and 440. This stops the operation of the take-up rollers. The lever 378 and the connections therefrom to the notched lever 374 are not, however, simultaneously operated, as the plate 451 simply slides on the rod 45 as a guide. When the notched lever 374 at the other side of the loom is raised, thereby, through rod 375, arm 376 and shaft 377, operating the arm 378, the latter, through the rod 45, lug 450 and plate 451, lifts the arm 388, and, through the connections described, renders the pawl 413 inoperative. While the lifting of arm 388 operates shaft 387 and raises arm 386, the latter does not effect the lifting of the notched lever 384, as the end of lever 386 simply moves up freely in the slotted upper end of rod 385 and does not lift it. Thus, whenever, a pick of hair is missed, both the shedding motion and take-up rollers are temporarily rendered inoperative, thus virtually stopping the operation of the loom until the next pick of hair is inserted.

Figure 12:
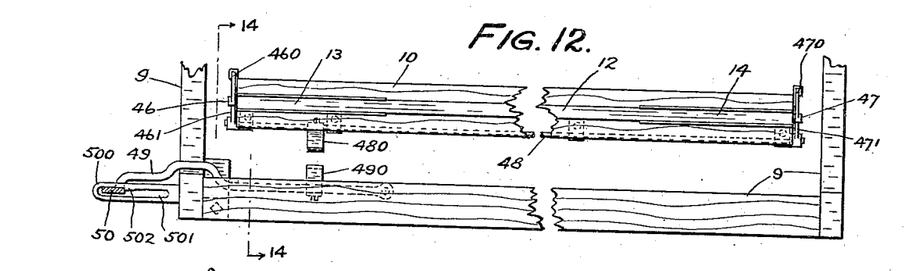
Fig. 12 is a detail plan view of the loom stop motion.
Figures 13, 14:
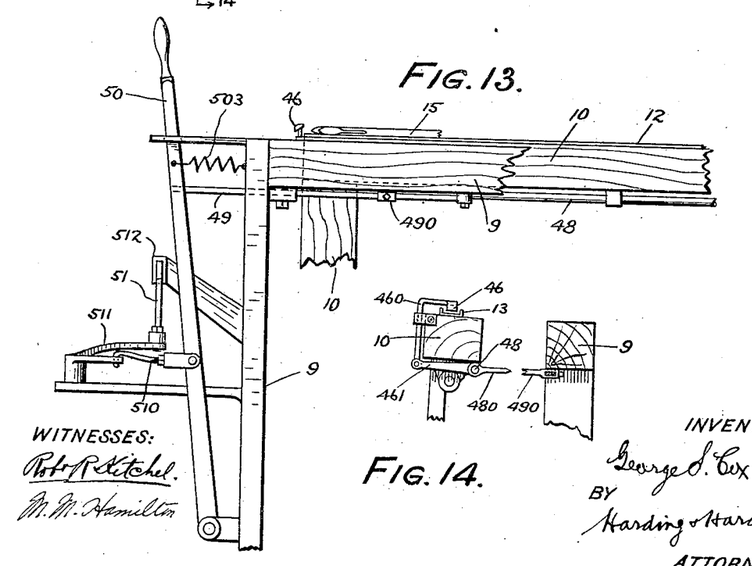
Fig. 13 is a detail front elevation of same.
Fig. 14 is a section on line 14—14 of Fig. 12.

If the shuttle, for any reason, fails to make a full throw, some derangement of the shuttle operating and controlling mechanism, necessitating repair or adjustment, is thereby indicated, and the loom should be stopped for this purpose. (See Figs. 12, 13 and 14.) The following means are provided to effect this automatically. 46, 47, are cam-faced lugs (see Figs. 12, 13 and 14) on opposite sides of the loom at opposite ends of the shuttle race, and adapted to be alternately engaged by the shuttle just before its final movements in opposite directions are completed. These lugs are secured respectively to the vertically movable hangers 460 and 470, slidable vertically in guides on the lay and connected respectively to the outer ends of arms 461 and 471, both secured to the shaft 48 extending across, and turning in bearings on, the lay. Secured to the shaft 48 is a lug 480. 49 is a tripping lever fulcrumed at one end on the breast beam of the loom. 490 is an ear on the lever 49. The ear 490 is bifurcated and adapted to be engaged by the lug 480. The normal position of the lug 480 is such as to engage the ear 490 at the end of the forward movement of the lay; but this is prevented by the engagement of the shuttle with either the lug 46 or the lug 47, which lifts the hanger 460 or 470 and the arm 461 or 471, thereby turning the shaft 48 and moving the lug 480 into such position that it passes under the ear 490. When, however, the shuttle fails to complete its throw, the shaft 48 and lug 480 are not operated, and the lug 480 engages the ear 490 and turns the lever 49 on its fulcrum. This movement of the lever 49 causes it to engage the belt shifting lever 50, which controls the shift of the belt from the fixed to the loose pulley, to stop the loom, as will now be described.

The belt-shifting lever 50 is of ordinary construction, being pivoted on the loom frame and normally resting, when the loom is in operation, in a notch 502 in the rear of a slot 501 formed in a bracket 500 on the loom frame. The lever 50 is connected, by means of a link 510, with one end of a bell-crank lever 511 pivoted on the loom frame. The other end of the bell-crank lever is connected to one end of the belt-shifting rod 51 sliding in a guide 512 on the loom frame and carrying the belt-guide 513.

52 and 53 are the fast and loose pulleys respectively on the driving shaft 28.

When, as before described, the tripping lever 49, by reason of the engagement of the lug 480 with ear 490, turns on its fulcrum and engages the belt-shifting lever 50, the latter is moved out of the notch 502 and into one end of the slot 501, the spring 503, connecting the loom frame and lever 50, drawing the latter to the other end of the slot, thereby actuating the belt-shifting rod to shift the belt from the driving pulley to the idle pulley.

Having now fully described my invention, what I claim and desire to protect by Letters Patent is:

1. In a loom, the combination, with a shuttle, of a shuttle-box at the side of the loom, means to propel the shuttle across the loom into the said shuttle-box, a stop adapted to arrest and reverse the movement of the shuttle, locking means adapted to cause the shuttle-box and shuttle to engage after the movement of the latter is arrested and reversed, and means to move the shuttle box with its contained shuttle in the direction in which the latter has been propelled.

2. In a loom, the combination with a shuttle, of a shuttle-box at the side of the loom, means to propel the shuttle across the loom into the said shuttle-box, mutually engageable locking means on the shuttle and shuttle-box, and a spring-pressed stop adapted, upon failure of said locking means to engage said shuttle in its advance movement to arrest and reverse the movement of the shuttle to give said locking means another opportunity to engage.

3. In a loom, the combination with a shuttle, of a picker-head and a shuttle-box at each side of the loom, means to move each picker-head inwardly to propel said shuttle toward and into the shuttle-box and against the picker-head at the opposite side of the loom, a spring-pressed stop outside each picker-head adapted, when the shuttle so strikes and moves a picker-head, to yield outwardly and then reverse the movement of the picker-head and shuttle, and locking means adapted to cause the shuttle-box and shuttle to engage in the latter's reverse movement.

4. In a loom, the combination with a shuttle, of a shuttle-box at the side of the loom, means to propel the shuttle across the loom into the said shuttle-box, a stop adapted to arrest the movement of the shuttle, means to move the shuttle-box to complete the movement of the shuttle, and means to withdraw said stop to enable the movement of the shuttle to be completed.

5. In a loom, the combination with a shuttle, of a shuttle-box at the side of the loom, means to propel the shuttle across the loom into the said shuttle-box, a stop adapted to arrest the movement of the shuttle, locking means adapted to cause the shuttle-box and shuttle to engage after the movement of the latter is arrested, means to move the shuttle-box to complete the movement of the shuttle, and means to withdraw said stop to enable the movement of the shuttle to be completed.

6. In a loom, the combination with a shuttle, of a shuttle-box at the side of the loom, means to propel the shuttle across the loom into the said shuttle-box, a spring-pressed stop movable against its spring to arrest the latter's movement, and means to move the stop out of the path of the shuttle to permit it to complete its throw after its movement is arrested.

7. In a loom, the combination with a shuttle, of a shuttle-box at the side of the loom, means to propel the shuttle across the loom into the said shuttle-box, a spring-pressed stop movable against its spring to arrest the latter's movement, a cam, and means controlled by said cam to withdraw said stop out of the path of the shuttle to permit it to complete its throw.

8. In a loom, the combination with a shuttle, of a shuttle-box at the side of the loom, means to propel the shuttle across the loom into the said shuttle-box, a stop adapted to arrest said movement of the shuttle, a lever, on which the stop is pivoted, adapted to withdraw said stop out of the path of movement of the shuttle, and a cam controlling the operation of the lever.

9. In a loom, the combination with a shuttle, of a shuttle-box at the side of the loom, means to propel the shuttle across the loom into the said shuttle-box, a spring-pressed stop movable against its spring in the direction of said movement of the shuttle to reverse the movement of the shuttle, locking means adapted on said reverse movement to cause said shuttle and shuttle-box to mutually engage, and means to withdraw said stop out of the path of movement of the shuttle.

10. In a loom, the combination with shuttle-boxes on each side of the loom and a shuttle, of means to throw said shuttle across the loom into said shuttle-boxes, respectively, and means to move each shuttle-box in a direction to complete the throw of the shuttle and to temporarily stop the movement of such shuttle-box between the beginning and end of its movement.

11. In a loom, the combination with a shuttle, of projections thereon, one near each end thereof, said projections sloping toward opposite ends of the shuttle and being cut away to form a shoulder facing toward the adjacent end of the shuttle, and shuttle-drivers, one at each end of the loom, each of which is adapted, when operated, to engage the shoulder of the projection nearest the side of the loom on which said shuttle-driver is located and propel the shuttle toward the opposite side of the loom, and means to operate the shuttle drivers.

12. In a loom, the combination with a shuttle-box at the side of the loom, of a shuttle adapted to be propelled across the loom into said shuttle-box, a locking lever on the shuttle-box adapted to engage the shuttle received by it, means to operate the shuttle-box to complete the throw of the shuttle, and a cam adapted, during the final movement of the shuttle, to engage said lever and disengage it from the shuttle.

13. In a loom, the combination with a shuttle-box at the side of the loom, of a shuttle adapted to be propelled across the loom into said shuttle-box, locking means and retarding means operating separately upon the shuttle after the entry of said shuttle into said box, and means to move the shuttle-box in the direction in which the shuttle has been thrown to complete the movement of the shuttle.

14. In a loom, the combination with a shuttle-box at the side of the loom, of a shuttle having two orifices, means to propel the shuttle across the loom into said shuttle-box, a locking lever and a retarding spring adapted to engage said orifices respectively, after the entry of the shuttle into the shuttle-box, and means to move the shuttle-box to complete the throw of the shuttle.

15. In a loom, the combination with a shuttle-box at the side of the loom, of a shuttle having two orifices, means to propel the shuttle across the loom into said shuttle-box, a locking lever and a retarding spring, one carried by the shuttle-box and the other by the lay, and located at a distance apart equal to the distance between said orifices when the shuttle-box is moved inwardly and adapted to then engage said orifices respectively, and means to move the shuttle-box to complete the throw of the shuttle.

16. In a loom, the combination with shuttle-boxes, one at each side of the loom, of a shuttle having orifices near each end thereof, means to propel the shuttle from one shuttle-box to the other, and locking means on each shuttle-box adapted to engage the orifice nearest the end of the shuttle entering such box and by its engagement with such orifice hold the shuttle in definite relation to the shuttle box.

17. In a loom, the combination with shuttle-boxes, one at each side of the loom, of a shuttle having orifices near each end thereof, each of said orifices having walls at opposite ends, means to propel the shuttle from one shuttle-box to the other, and locking means, one on each shuttle-box, one locking means adapted to engage one of said orifices and the other to engage the other of said orifices, and thereby hold the shuttle from longitudinal movement in either direction.

18. In a loom, the combination with a shuttle having orifices near each end thereof, of a shuttle-box at the side of the loom, means to propel the shuttle across the loom into the said shuttle-box, a retarding device adapted to successively engage both of said orifices, and a locking device, located at a distance from the retarding device substantially equal to the distance between said orifices, adapted to engage the foremost orifice and hold the shuttle in definite relation to the shuttle-box.

19. In a loom, the combination with a shuttle-box at the side of the loom, of a shuttle and means to propel the shuttle across the loom into said box, a retarding device adapted to retard without stopping said movement of the shuttle, and means adapted to subsequently stop the shuttle and hold it in definite relation to the shuttle-box, and means to thereafter move the shuttle-box with its contained shuttle in the direction in which it has been thrown.

20. In a loom, the combination with a shuttle-box at the side of the loom, of a shuttle and means to propel the shuttle across the loom into said box, a retarding device adapted to retard said movement of the shuttle, an independent arresting and reversing means adapted to arrest and reverse said movement of the shuttle, and independent locking means to engage the reversed shuttle and hold it in definite relation to the shuttle-box.

21. In a loom, in combination with the shuttle, of a shuttle-box at the side of the loom, means to propel the shuttle across the loom into the said shuttle-box, a retarding device adapted to retard the movement of the shuttle, mutually engageable locking means on the shuttle and shuttle-box adapted to operate after the movement of the shuttle is retarded, and a device adapted, upon failure of said locking means to engage said shuttle in its advance movement, to arrest and reverse the movement of the shuttle and give said locking means another opportunity to engage.

22. In a loom, the combination with a shuttle having orifices near each end thereof, of a shuttle-box at the side of the loom, means to propel the shuttle across the loom into the said shuttle-box, a retarding device adapted to successively engage both of said orifices, a locking device, located at a distance from the retarding device substantially equal to the distance between said orifices, adapted to engage the foremost orifice and hold the shuttle in definite relation to the shuttle-box, a spring-pressed stop adapted, upon failure of the retarding and locking devices to stop the shuttle at the proper point, to yieldingly arrest the shuttle and return it into engagement with said locking and retarding devices.

23. In a loom, the combination with a shuttle, having a movable jaw at each end, adapted to be propelled across the loom, of a cam at each side of the loom adapted, in the movement of the shuttle, to open the latter's trailing movable jaw, means to normally withdraw the cam from operative position, a second cam, and means controlled by the second cam to advance the first cam into operative position.

24. In a loom, the combination with a shuttle, having a movable jaw at each end, adapted to be propelled across the loom, of a cam at each side of the loom, adapted, in the movement of the shuttle, to open the latter's trailing movable jaw, a bar by which the cam is carried, a vertically movable arm, a cam on the arm adapted to move said bar into operative position, and means to move said arm.

25. In a loom, the combination with a shuttle, having a movable jaw at each end, adapted to be propelled across the loom, of a cam at each side of the loom adapted, in the movement of the shuttle, to open the latter's trailing movable jaw, a bar by which the cam is carried, a vertically movable arm, a cam on the arm adapted to move said bar into operative position, a third cam, and a lever controlled thereby to which said arm is attached.

26. In a loom, the combination with a shuttle, having a movable jaw at each end, adapted to be propelled across the loom, of a cam at each side of the loom adapted, in the movement of the shuttle, to open the latter's trailing movable jaw, a bar by which the cam is carried, a spring tending to hold said bar and cam out of operative position, a shaft, means to turn the shaft, a lever, an arm attached to the lever, a cam on the arm adapted, when the lever and arm are raised, to move said bar and the cam carried thereby into operative position, a spring tending to raise said arm and lever, and a cam on said shaft engaging said lever and permitting the last named spring to act at predetermined intervals.

27. In a loom, the combination with shuttle-boxes at both sides of the loom, of a shuttle, means to propel the shuttle from one side of the loom to the other and into said shuttle-boxes respectively, a rocking lever, means connecting the rocking lever with both shuttle boxes, treadles connected with the rocking lever, a shaft, and means on the shaft to operate the treadles alternately.

28. In a loom, the combination with shuttle boxes at both sides of the loom, of a shuttle, means to propel the shuttle from one side of the loom to the other and into said shuttle-boxes respectively, a pair of treadles, cams on the treadles, a shaft, a pair of segmental wheels on the shaft adapted to engage said cams respectively and alternately, each set of segmental wheels and cams being of sufficient length to maintain their mutual engagement for at least half a revolution of the shaft, whereby one treadle is not disengaged before the other treadle is engaged.

29. In a loom, the combination with shuttle-boxes at both sides of the loom, of a shuttle, means to propel the shuttle from one side of the loom to the other and into said shuttle-boxes respectively, a rocking lever, means connecting the rocking lever with both shuttleboxes, treadles connected with the rocking lever, a cam on each treadle, a shaft, and segmental wheels on the shaft adapted to alternately engage said treadle cams.

30. In a loom, the combination with a shuttle-box at the side of the loom, and a shuttle, and means to propel the shuttle across the loom into the shuttle-box, of a treadle, connections between the treadle and the shuttle-box, a shaft, a cam on the treadle, and means on the shaft engaging said cam, the latter being shaped to cause said treadle to be first given a part of its movement, then held stationary, and then given the balance of its movement.

31. In a loom, the combination with shuttle-boxes at both sides of the loom, of a shuttle, means to propel the shuttle from one side of the loom to the other and into said shuttle-boxes respectively, a rocking lever pivoted between its ends, means connecting the rocking lever and shuttle-boxes, treadles, links connecting the treadles with the opposite ends of the rocking-lever, a cam on each treadle, a shaft, and segmental wheels diametrically arranged on the shaft and engaging the treadles respectively.

32. In a loom, the combination with shuttle-boxes at both sides of the loom, of a shuttle, means to propel the shuttle from one side of the loom to the other and into said shuttle-boxes respectively, a rocking lever, means connecting the rocking lever and both shuttle-boxes, a driven shaft, and means operated thereby to rock said lever, thereby moving one shuttle-box toward, and the other shuttle-box simultaneously away from, the sides of the loom adjacent to the respective shuttle boxes.

33. In a loom, the combination with a shuttle-box at the side of the loom, a shuttle, and means to propel the shuttle across the loom into the shuttle-box, of a shaft, connections to the shuttle-box operated from the shaft to operate the shuttle-box in the direction in which the shuttle has been propelled, thereby completing the throw of the shuttle, and a cam in said connections causing the shuttle-box to be temporarily stopped in its movement.

34. In a loom, the combination with a shuttle at each side of the loom, and means to propel the same in both directions across the loom, of a shuttle-box at each side of the loom adapted to receive the shuttle so propelled, means to move the shuttle-box to complete the throw of the shuttle, locking means adapted to hold the shuttle in the box, a stop adapted to arrest the shuttle and insure the operation of the locking means, means to open the trailing jaw of the shuttle, the lay, a shaft carried by the lay, cams thereon, means controlled by said cams respectively to cause said stop and jaw-opener to be moved into and out of operative position, and means to turn said shaft.

35. In a loom, the combination with a receptacle for the hair, of a selector adapted to select a strand of hair from the receptacle, a shuttle adapted to grasp a strand of hair selected by the selector and insert it between the warp sheds, a driven shaft, a cam thereon, and connections actuated by the cam and actuating the hair receptacle to impart to it a step-by-step movement back and forth.

36. In a loom, the combination with the driving shaft, the lay, and means actuated by the former to drive the latter, of a hair receptacle, a selector, a shuttle adapted to insert a strand of hair selected by the selector between the warp sheds, and devices, actuated from the driving shaft independently of the lay, to impart to the hair receptacle a step-by-step movement back and forth.

37. In a loom, the combination with a selector and a shuttle adapted to grasp the hair selected by the selector and pull it across the loom, of a finger adapted to be operated by such hair, a lever, means adapted to engage and actuate said lever when the latter is in its normal position, dobby actuating mechanism, means actuated by said lever to render said dobby actuating mechanism inoperative, a cam finger operated by said finger, said cam finger in its movement sliding along said lever and moving it into and holding it in inoperative position.

38. In a loom, the combination with a selector and a shuttle adapted to grasp the hair selected by the selector and pull it across the loom, of a finger adapted to be operated by such hair, a lever, means adapted to engage and actuate said lever when the latter is in its normal position, dobby actuating mechanism, means actuated by said lever to render said dobby actuating mechanism inoperative, a cam finger operated by said finger, said cam finger extending at such an angle to said lever that in its movement it wedges itself against said lever and moves said lever into inoperative position, and means to restore the fingers to their normal positions.

39. In a loom, the combination with a selector and a shuttle adapted to grasp the hair selected by the selector and pull it across the loom, of a finger adapted to be operated by such hair, a lever, means adapted to engage and actuate said lever when the latter is in its normal position, dobby actuating mechanism, means actuated by said lever to render said dobby actuating mechanism inoperative, a cam finger operated by said finger, said cam finger in its movement sliding along said lever and moving it into inoperative position, the lay, and means on the lay to restore the fingers to their normal positions.

40. In a loom, the combination with a selector and a shuttle adapted to grasp the hair selected by the selector and pull it across the loom, of a finger adapted to be operated by such hair, a lever, means adapted to engage and actuate said lever when the latter is in its normal position, dobby actuating mechanism, means actuated by said lever to render said dobby actuating mechanism inoperative, a cam finger operated by said finger, said finger in its movement sliding along said lever and moving it into inoperative position, the lay, and a third finger on the lay adapted to engage the first finger and restore it and the second finger to their normal positions.

41. In a loom, the combination with a selector and a shuttle adapted to grasp the hair selected by the selector and pull it across the loom, of a finger adapted to be operated by such hair, a lever, means adapted to engage and actuate said lever when the latter is in its normal position, dobby actuating mechanism, means actuated by said lever to render said dobby actuating mechanism inoperative, a shaft to which said finger is secured, a cam finger secured to said shaft, said cam finger in its movement sliding across said lever and moving it into inoperative position, the lay, and means carried by the lay to restore said fingers and shaft to their normal positions.

42. In a loom, the combination with the take-up means, and mechanism imparting to the take-up means a step-by-step movement, of a selector, a shuttle adapted to grasp the hair selected by the selector and pull it across the loom, a finger adapted to be operated by such hair, a lever, means adapted to engage and actuate said lever when the latter is in its normal position, means actuated by said lever to render said take-up actuating mechanism inoperative, a cam finger operated by said finger, said cam finger in its movement sliding along said lever and moving it into and holding it in inoperative position.

43. In a loom, the combination with the take-up means and mechanism imparting to the take-up means a step-by-step movement, of a selector, a shuttle adapted to grasp the hair selected by the selector and pull it across the loom, a finger adapted to be operated by such hair, a lever, means adapted to engage and actuate said lever when the latter is in its normal position, means actuated by said lever to render said take-up actuating mechanism inoperative, a cam finger operated by said finger, said cam finger extending at such an angle to said lever that in its movement it wedges itself against said lever and moves said lever into inoperative position, and means to restore the fingers to their normal positions.

44. In a loom, the combination with the take-up means and mechanism imparting to the take-up means a step-by-step movement, of a selector, a shuttle adapted to grasp the hair selected by the selector and pull it across the loom, a finger adapted to be operated by said hair, a lever, means adapted to engage and actuate said lever when the latter is in its normal position, means actuated by said lever to render said take-up actuating mechanism inoperative, a cam finger operated by said finger, said cam finger in its movement sliding along said lever and moving it into inoperative position, and means on the lay to restore the fingers to their normal positions.

45. In a loom, the combination with the take-up means and mechanism imparting to the take-up means a step-by-step movement, of a selector, a shuttle adapted to grasp the hair selected by the selector and pull it across the loom, a finger adapted to be operated by such hair, a lever, means adapted to engage and actuate said lever when the latter is in its normal position, means actuated by said lever to render said take-up actuating mechanism inoperative, a cam finger operated by said finger, said cam finger in its movement sliding along said lever and moving it into inoperative position, the lay, and a third finger on the lay adapted to engage the first finger and restore it and the second finger to their normal positions.

46. In a hair-cloth loom, the combination with the take-up means and mechanism imparting to the take-up means a step-by-step movement, of a selector, a shuttle adapted to grasp the hair selected by the selector and pull it across the loom, a finger adapted to be operated by such hair, a lever, means adapted to engage and actuate said lever when the latter is in its normal position, means actuated by said lever to render said take-up actuating mechanism inoperative, a shaft to which said finger is secured, a cam finger secured to said shaft, said cam finger in its movement sliding across said lever and moving it into inoperative position, the lay, and means carried by the lay to restore said fingers and shaft to their normal positions.

47. In a hair-cloth loom, the combination with a selector and a shuttle adapted to grasp the hair selected by the selector and pull it across the loom, of a lever, means adapted to engage and actuate said lever when the latter is in its normal position, dobby actuating mechanism, take-up roll actuating mechanism, means actuated by said lever to render said mechanism inoperative, a cam finger adapted to slide across said lever and move it from and hold it out of its normal position, said cam finger being caused to operate by the hair inserted between the warp sheds, and means to restore the cam finger to its normal position.

48. In a loom, the combination with a selector and a shuttle adapted to grasp the hair selected by the selector and pull it across the loom, of a lever, means to engage and actuate said lever when the latter is in its normal position, dobby actuating mechanism, means actuated by said lever to render said dobby actuating mechanism inoperative, a device adapted to be moved by the hair to engage and hold said lever out of its normal position, the lay, and means on the lay to restore said device to position to again be actuated by the hair.

49. In a loom, the combination with a selector and a shuttle adapted to grasp the hair selected by the selector and pull it across the loom, of a lever, means to engage and actuate said lever when the latter is in its normal position, take-up means, mechanism imparting to the take-up means a step-by-step movement, means actuated by said lever to render said take-up actuating mechanism inoperative, a device adapted to be moved by the hair to engage and hold said lever out of its normal position, the lay, and means on the lay to restore said device to position to again be actuated by the hair.

50. In a hair-cloth loom, the combination with selectors, one on each side of the loom, of a shuttle adapted to grasp the hair selected by a selector and pull it across the loom, levers 374, 384, one on each side of the loom, means adapted to engage and actuate each lever when the latter is in its normal position, fingers one on each side of the loom adapted to be operated by the hair so pulled by the shuttle, means enabling said fingers to move their corresponding levers away from their normal positions, the dobby cylinder, mechanism, 378, 39, 366, 365, 388, 389, by which the operation of the dobby cylinder is controlled, sliding connections between said mechanism and said levers by which each lever operates, but is not operated by, said mechanism, take-up means, mechanism imparting to the take up means a step-by-step movement, and connections between the dobby actuating mechanism and the take-up actuating mechanism adapted when operated to render the take up actuating mechanism inoperative.

51. In a hair-cloth loom, the combination with selectors one on each side of the loom, of a shuttle adapted to grasp the hair selected by a selector and pull it across the loom, of levers, 374, 384, one on each side of the loom, means adapted to engage and actuate each lever when the latter is in its normal position, fingers one on each side of the loom adapted to be operated by the hair so pulled by the shuttle, means enabling said fingers to move their corresponding levers away from their normal positions, two shafts, 377, 387, arms, 376, 386, one on each shaft, rods, 375, 385, one connecting each arm with the corresponding lever, a slide 39, a second pair of arms, 378, 388, one on each shaft, adapted when operated by its respective shaft, to operate said slide, the dobby cylinder, connections between the slide and the dobby cylinder, take-up means, mechanism imparting to the take up means a step-by-step movement, connections between one of the first-named arms and said take-up actuating mechanism adapted when operated to render said mechanism inoperative, and connections between the arms 378, 388, by which the first operates the second.

52. In a hair-cloth loom, the combination with selectors, one on each side of the loom, of a shuttle adapted to grasp the hair selected by a selector and pull it across the loom, of levers 374, 384, one on each side of the loom, means adapted to engage and actuate each lever when the latter is in its normal position, fingers one on each side of the loom adapted to be operated by the hair so pulled by the shuttle, means enabling said fingers to move their corresponding levers away from their normal positions, two arms, 376, 386, two rods, 375, 385, connected with said levers respectively, one rod being pivoted to one arm, and the other rod having a sliding connection with the other arm, a shaft 377 on which the first arm is secured, a second shaft 387 on which the second arm is secured, a third arm 378 secured to the first shaft, a fourth arm 388 secured to the second shaft, the dobby cylinder, connections to the dobby cylinder adapted to be operated by either of the two last named arms, take-up means, mechanism imparting to the take-up means a step-by-step movement, connections between the second arm 386 and said take-up actuating mechanism adapted when operated to render said mechanism inoperative, and sliding connections between the third and fourth arms 378 and 388 by which the former operates, but is not operated by, the latter.

In testimony of which invention, I have hereunto set my hand, at Philadelphia, on this 12th day of November, 1906.

GEORGE S. COX.

Witnesses:
E. C. SEIBERLICH,
HOWARD L. GODFREY.